(12) United States Patent
Bobryshev et al.

(10) Patent No.: US 11,194,170 B2
(45) Date of Patent: Dec. 7, 2021

(54) TORSION SPRING SPECKLE DIFFUSER

(71) Applicant: WAYRÄY SA, Zürich (CH)

(72) Inventors: Aleksandr Bobryshev, Zürich (CH); Irina Gavrilovich, Zürich (CH); Vitaly Ponomarev, Zürich (CH)

(73) Assignee: WAYRAY AG, Zürich (CH)

( * ) Notice: Subject to any disclaimer, the term of this patent is extended or adjusted under 35 U.S.C. 154(b) by 0 days.

(21) Appl. No.: 16/604,520

(22) PCT Filed: Aug. 31, 2018

(86) PCT No.: PCT/IB2018/001099
§ 371 (c)(1),
(2) Date: Oct. 10, 2019

(87) PCT Pub. No.: WO2019/043453
PCT Pub. Date: Mar. 7, 2019

(65) Prior Publication Data
US 2020/0183177 A1    Jun. 11, 2020

Related U.S. Application Data

(60) Provisional application No. 62/553,697, filed on Sep. 1, 2017.

(51) Int. Cl.
*G03B 21/20* (2006.01)
*G02B 27/48* (2006.01)
(Continued)

(52) U.S. Cl.
CPC ............ *G02B 27/48* (2013.01); *G02B 5/0294* (2013.01); *G03B 21/204* (2013.01); *G02B 27/0101* (2013.01)

(58) Field of Classification Search
CPC .............. G03B 21/2033; G03B 21/208; G03B 21/204; G03B 21/206; H04N 9/3152; H04N 9/3161; G02B 27/48; G02B 5/02–5/0294
See application file for complete search history.

(56) References Cited

U.S. PATENT DOCUMENTS

| 8,500,287 B2 | 8/2013 | Moussa |
| 8,724,218 B2 | 5/2014 | Curtis et al. |

(Continued)

FOREIGN PATENT DOCUMENTS

| WO | 2009087358 A1 | 7/2009 |
| WO | 2010/027563 A1 | 3/2010 |
| WO | 2019/088453 A1 | 5/2019 |

OTHER PUBLICATIONS

International Patent Office—Notification Concerning Transmittal of International Preliminary Report on Patentability dated Mar. 12, 2020 from International Application No. PCT/IB2018/001099, 11 pages.

(Continued)

*Primary Examiner* — Ryan D Howard
(74) *Attorney, Agent, or Firm* — Schwabe, Williamson & Wyatt, P.C.

(57) ABSTRACT

Devices for applying vibration and/or sliding motion to speckle diffusers are provided. A speckle diffusion device comprises at least one speckle diffuser element, one free form torsion spring with an axis of rotation, and at least one actuator. One end of the torsion spring includes an interaction element to interact with the actuator. The actuator actuates motion of the speckle diffusion element via the interaction element attached to the spring. The spring may also limit motion of the speckle diffuser element. The speckle diffusion device may be implemented or employed in various optical systems/devices. The speckle diffusion (Continued)

device may be easily adapted to accommodate various systems with various dimensions and geometry. Other embodiments may be disclosed and/or claimed.

29 Claims, 6 Drawing Sheets

(51) Int. Cl.
  *H04N 9/31* (2006.01)
  *G02B 5/02* (2006.01)
  *G02B 27/01* (2006.01)

(56) References Cited

U.S. PATENT DOCUMENTS

| | | |
|---|---|---|
| 2009/0185251 A1 | 7/2009 | Chen et al. |
| 2010/0118278 A1* | 5/2010 | Kobayashi ......... H02K 41/0354 353/38 |
| 2014/0043589 A1 | 2/2014 | Chifu et al. |
| 2016/0085083 A1* | 3/2016 | Murota .................. G02B 27/48 353/38 |

OTHER PUBLICATIONS

International Search Report and Written Opinion dated Apr. 26, 2019 from International Application No. PCT/IB2018/001099, 14 pages.

* cited by examiner

TORSION SPRING SPECKLE DIFFUSER

RELATED APPLICATIONS

The present application is a national stage entry under 35 U.S.C. § 371 of International Application No. PCT/IB2018/001099 filed Aug. 31, 2018, which claims priority under 35 U.S.C. § 119 to U.S. Provisional Application No. 62/553,697 filed Sep. 1, 2017, the contents of each of which are hereby incorporated by reference in their entireties.

FIELD

Embodiments discussed herein are related to speckle diffuser devices, and in particular, to speckle diffuser devices including torsion springs that provide motion to the speckle diffuser device.

BACKGROUND

Lasers are ideal light sources for projector devices, such as pico-projectors, due to their power efficiency, brightness, and color gamut ranges. However, laser-illuminated surfaces often produce speckle. Speckle is a granular pattern of bright and dark regions of intensity that occurs when laser light is scattered (or reflected) from a rough surface. Speckle in projected images may cause eye strain, which may result in user/observer headaches. Speckle diffuser devices (also referred to as "speckle diffusers" or "diffusers") are devices used in optics to destroy spatial coherence (or coherence interference) of laser light prior to reflection from a surface.

Some diffusers reduce speckle through temporal averaging of the irradiance pattern using a diffractive element, such as a glass lens. The temporal averaging occurs from rotation or vibration of the diffractive element. As the diffuser moves (e.g., rotates or vibrates), the diffuser may average out the undesirable effect of speckles by making a coherence time much smaller than an exposure time.

SUMMARY

Embodiments provide a speckle diffuser device with a torsion spring which applies vibrations or other movements to a speckle diffuser element by means of forces having different nature. In embodiments, an initial actuation may be applied by actuation means. The actuation means may include electric, mechanical, and/or magnetic-based actuator(s). The actuation means may interact with the torsion spring to cause the diffuser element to rotate, vibrate, or otherwise move.

In embodiments, the actuation means may include means of interaction between a permanent magnet on the end of a spring and an electromagnet. Manipulation of the electromagnet may cause the movement of the spring, which may cause the diffuser element to vibrate. Vibrations of the diffuser element may be sustained by the gravity and spring torques. Balance of the spring elasticity and its moment arms may provide relatively long and sustainable diffuser motion between actuation of the actuation means.

Various embodiments may include variations in shape, dimensions and number of engaged components. In various embodiments, the torsion spring may have a certain axis of rotation, which location, as well as the shape of the spring, differs depending on the design of the accommodating structure. In embodiments, coils of the torsion spring may be used as a placement of the rotation axis. In embodiments, a first end of the spring may be coupled with a permanent magnet and a second end of the spring may apply force to the diffuser element (or a frame that holds the diffuser element). In some embodiments, tips (ends) of the spring may provide motion limits for the diffuser element. In other embodiments, a frame that contains or otherwise holds the diffuser element may provide motion limits for the diffuser element. Other embodiments may be described and/or claimed.

BRIEF DESCRIPTION OF THE DRAWINGS

A clear understanding of the invention summarized above may be had by reference to the accompanying drawings, which illustrate the invented apparatus and the preferred embodiment of the invention. Although it will be understood that such drawings are not to be considered as limiting the scope of the invention with regard to other embodiments. Accordingly.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B).

It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. The phrase "in various embodiments," "in some embodiments," and the like are used repeatedly. The phrase generally does not refer to the same embodiments; however, it may. The description may use the phrases "in an embodiment," "in embodiments," "in some embodiments," and/or "in various embodiments," which may each refer to one or more of the same or different embodiments.

Figure 1:
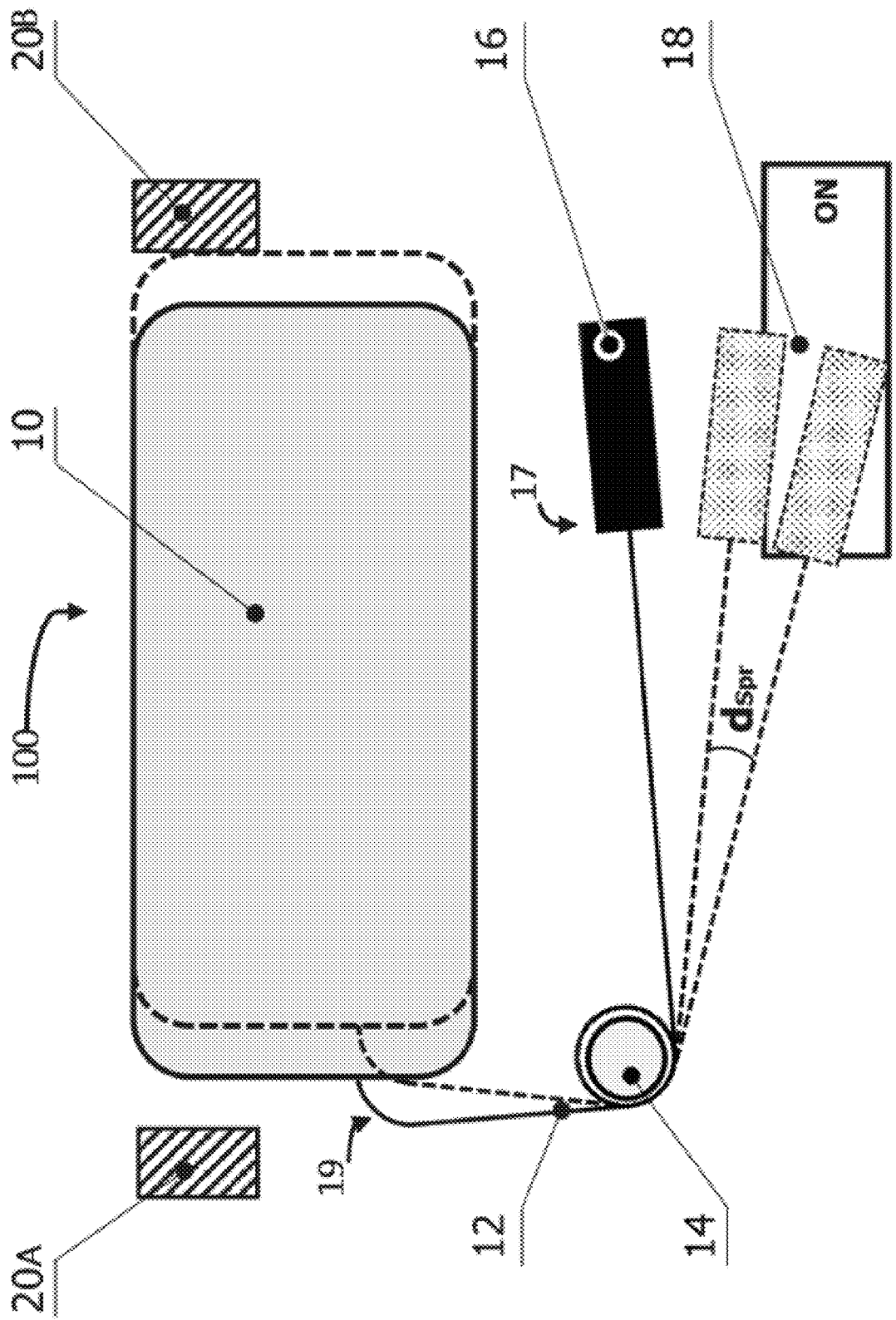
FIGS. 1 and 2 depict an example speckle diffuser device in accordance with various embodiments.
Figure 2:
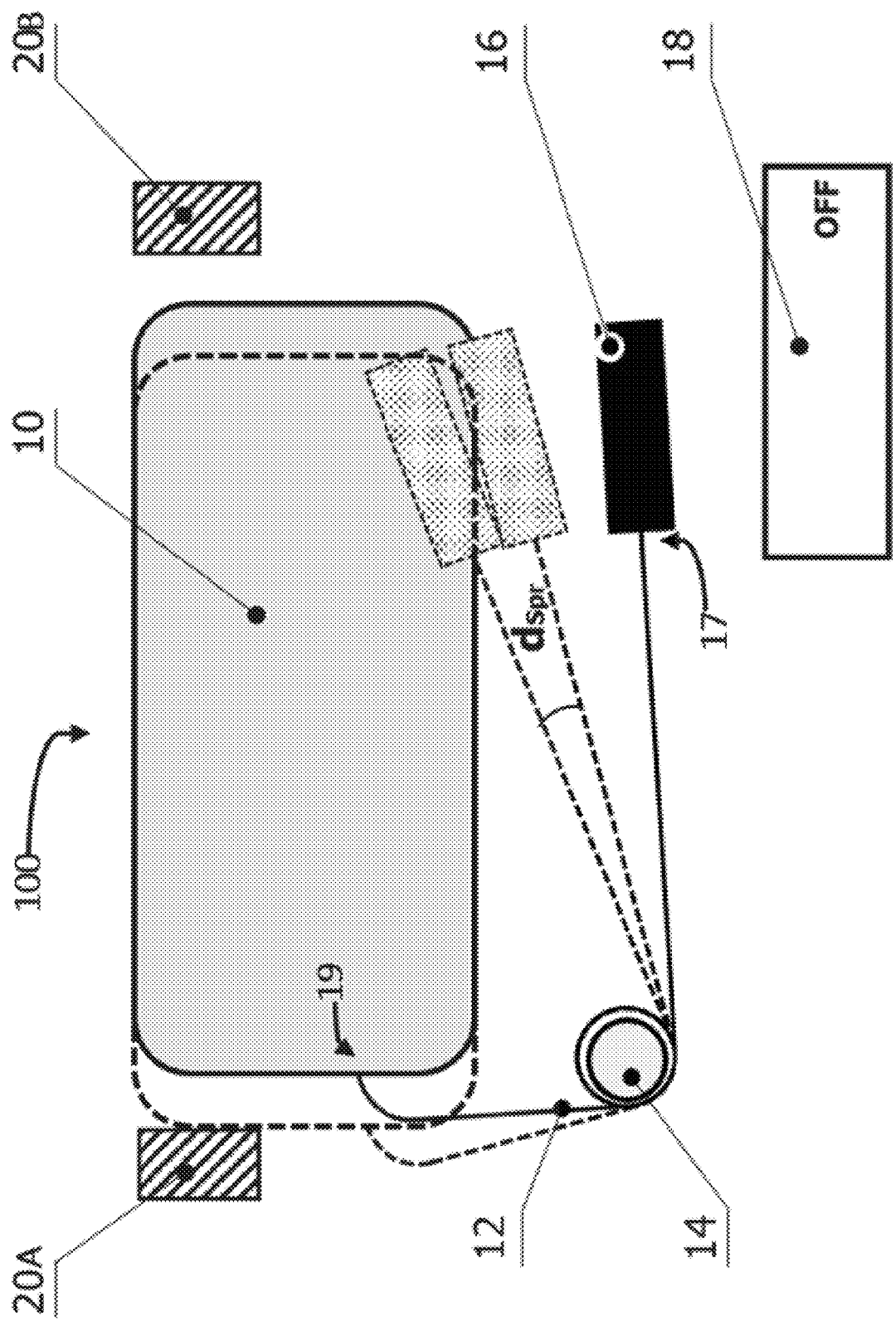

Referring now to the figures, FIGS. 1-5 depict an example speckle diffuser device 100 (or portions thereof) for applying vibrations, oscillations, and/or sliding motions to a speckle diffuser element 10 according to various embodiments. In particular, FIG. 1 illustrates an example diffuser device 100 comprising a torsion spring 12 with a permanent magnet 16 at a first end 17 of the spring 12, which motion is actuated by interaction with a fixed electromagnet 18. FIG. 2 illustrates the diffuser 100 with a torsion spring 12 having self-oscillations when an external actuator (e.g., electromagnet 18) is turned off.

In embodiments, the device 100 comprises a speckle diffuser element 10 (also referred to as "diffuser element 10," "diffuser 10," and the like), which can move within a certain range of motion. This range of motion is limited by limiters 20A and 20B (collectively referred to as "limiters 20" or "limiter 20") disposed on both sides of the diffuser element 10. The diffuser element 10 may be connected, attached, or coupled, using any suitable means, to torsion spring 12. The diffuser element 10 may be made of any suitable material, such as glass, ground glass, silica, fused silica, opal, ceramic materials, sapphire, quartz, calcium fluoride (CaF2), magnesium fluoride (MgF2), zinc selenide (ZnSe), polytetrafluoroethylene (PTFE), and the like and/or combinations thereof. The diffuser element 10 may have a geometry/shape (e.g., dimensions (height, width, depth) and curvature (concave, flat, convex, etc.)) depending on the shape and features of the structure/frame of the device 100, and/or may be application dependent. The geometry (shape) of the torsion spring 12 may be different from the depicted shape in the example of FIGS. 1-2 depending on the shape and features of the structure/frame of the device 100. The spring 12 may freely rotate around an axis 14. The permanent magnet 16 connected to the first end 17 (free tip) of the torsion spring 12 is used to apply an initial actuation pulse to the system by interacting with an electromagnet 18.

The electromagnet 18 may be any suitable electromagnet, such as an iron core solenoid, and/or the like. In order to operate the actuation, current is supplied to coil(s) of the electromagnet 18 (not shown) using any suitable means. The specific means for supplying current to the coil(s) of the electromagnet 18 should be well within purview of one skilled in the art. The powering on/off of the electromagnet 18 and the amount of current supplied to the electromagnet 18 (which may affect the strength and direction of the electromagnetic field of the electromagnet 18) is controlled using a suitable computer device (see e.g., FIG. 6), such as a microprocessor or special-purpose processor specifically built and configured to control the electromagnet 18 (hereinafter referred to as a "controller"). Well known power/ground connections power source(s), to integrated circuit (IC) chips and other components are not shown within FIGS. 1-4B for simplicity of illustration and discussion, and so as not to obscure the disclosure the illustrated embodiments. As examples, an electronic control units (ECU) 622, an electromechanical components (EMC) 624, or a microcontroller or microprocessor of a PGU 630 (see e.g., discussion with regard to FIG. 6 infra) may be the controller that supplies current to the electromagnet 18.

The controller is configured to provide varying amounts of current to a coil of the electromagnet in order to control the strength of the magnetic field. Different magnetic field strengths and/or release timings may provide different oscillation/vibration frequencies for the diffuser element 10, which may provide speckle diffusion for various frequencies/magnitudes of laser light. For example, the controller may provide more or less current to the electromagnet 18 to attract the magnet 16 towards the electromagnet 18 during an attraction phase of the actuation (e.g., to control/adjust the amount of potential energy of the spring 12), and may provide varying amounts of current to the electromagnet 18 during a release phase of the actuation (e.g., to control/adjust the amount of energy released by the spring 12).

In the embodiment depicted by FIG. 1, motion of the speckle diffuser 10 is initiated when the electromagnet 18 is powered on and interacts via magnetism with the permanent magnet 16. The interaction between the electromagnet 18 and the permanent magnet 16 may pull the free tip (first end 17) of the torsion spring 12 towards the electromagnet 18. Due to the movement of the first end 17 towards the electromagnet 18, a second end 19, which is attached to the diffuser element 10 (or a frame that holds the diffuser element 10), may cause the spring 12 to push the speckle diffuser 10 until the corresponding limiter 20B. The interaction between the magnet 16 deforms the spring 12 by a certain predefined deformation angle $d_{Spr}$ until the first end 17 with the magnet 16 reaches a certain predefined position. As the first end 17 travels along the deformation angle $d_{Spr}$, the spring 12 gains energy, which is used to cause the oscillation/vibration of the diffuser element 10 when released. In some embodiments, this predefined position may include the magnet 16 being on or touching the electromagnet 18.

FIG. 2 depicts the device 100 after torsion spring 12 is deformed and the electromagnet 18 is powered off. Powering off the electromagnet 18 may cause the magnet 16 to be released and cause the magnet 16 and the spring 12 to move away from the electromagnet 18. When the spring 12 is released, the spring 12 may exert a rotational force (e.g., torque) in the direction opposite to the direction it was twisted. The released energy of the spring 12 may push the diffuser element 10 in an opposite direction until the diffuser element 10 reaches or comes into contact with the second limiter 20A. Upon or after reaching or coming into contact with the second limiter 20A, the diffuser element 10 may oscillate or move laterally between the limiters 20. The amount of energy applied to the diffuser element 10 is a function of the deformation angle $d_{Spr}$ prior to releasing the first end 17.

In embodiments, the released energy should be sufficient to twist the spring 12 when the diffuser 10 reaches its limit of motion (e.g., when the diffuser element 10 reaches or comes into contact with limiter 20A). In embodiments, a second actuation pulse is applied by the electromagnet 18 when the stored energy in the torsion spring 12 has dissipated. A good balance of the moment arms of the spring 12 and its elasticity provides a long-time device operation without additional actuations.

In other embodiments, movement of the first end 17 toward the electromagnet 18 is to cause the spring 12 to pull the speckle diffuser 10 until the speckle diffuser 10 reaches or comes into contact with the limiter 20A. Upon release of the magnet 16, the spring 12 pushes the speckle diffuser 10 until the speckle diffuser 10 reaches or comes into contact with the limiter 20B. The direction of movement of the diffuser 10 may be based on a shape or design of the spring 12 and/or the coil of the spring 12 wrapped around the axis 14.

Figure 3:
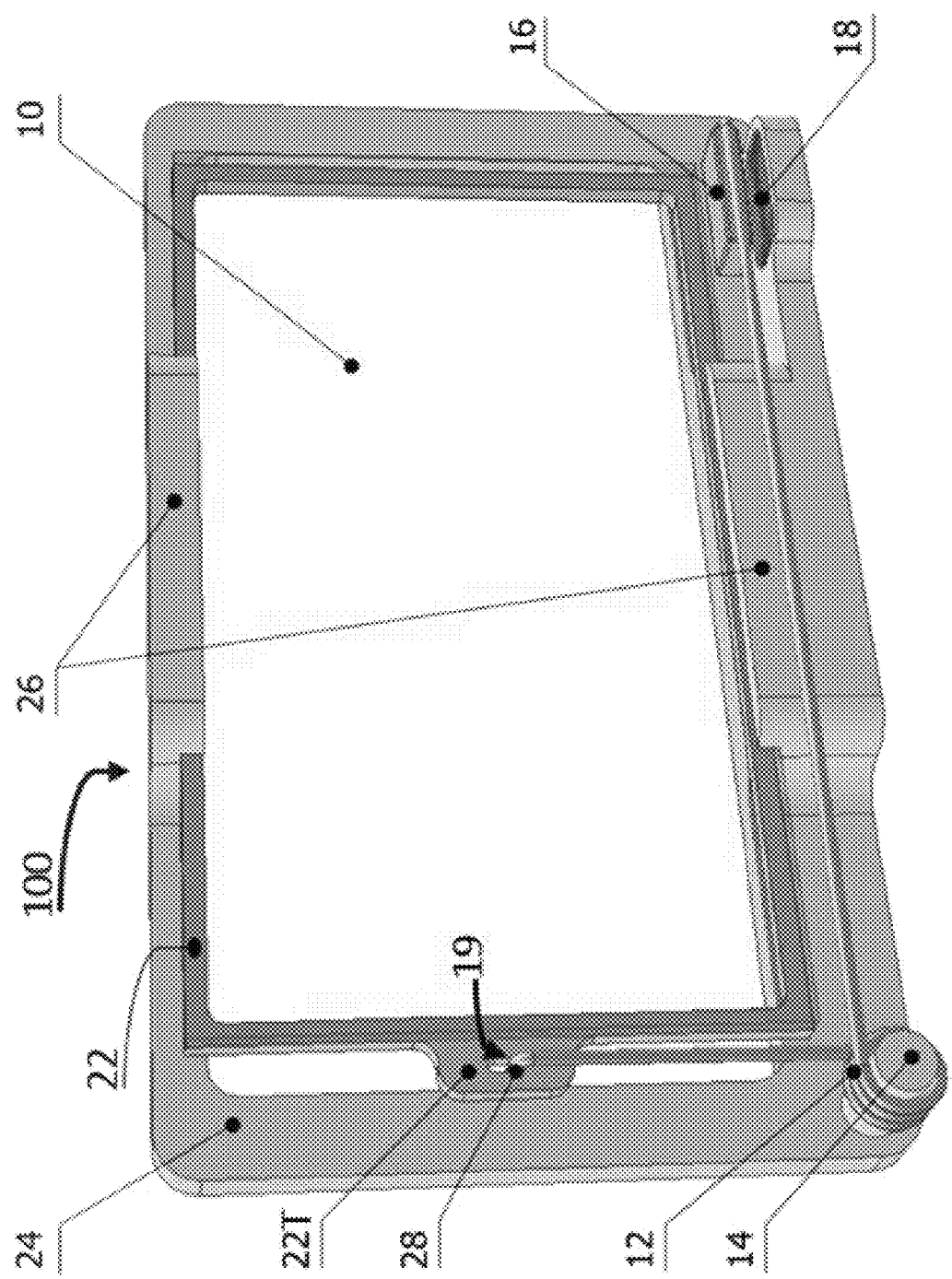
FIG. 3 depicts a perspective view of an example speckle diffuser device in accordance with various embodiments.

FIG. 3 depicts a perspective view of the speckle diffuser device 100 in accordance with various embodiments. FIG. 3 provides a more detailed illustration of an embodiment of the speckle diffuser device 100. In this embodiment, the speckle diffuser device 100 comprises a speckle diffuser element 10 contained or enclosed within (or otherwise fixed to) a diffuser frame 22. The diffuser frame 22 holds or otherwise support the diffuser element 10 during oscillation/vibration/movement. The frame 22 is coupled with a diffuser housing 24 (also referred to as "housing 24," "holding structure 24," "structure 24," and the like) via rails 26 (also referred to as "channels 26," "movement supports 26," "tracks 26," and the like). The frame 22 is capable of sliding (laterally) along rails 26 in the holding structure 24 during oscillation/vibration of the diffuser element 10. In this regard, the rails 26 provide or enclose a space or place through which the frame 22 may slide.

In the embodiment shown by FIG. 3, the rails 26 are disposed or positioned on a top portion of a holding structure 24 and a bottom portion of the holding structure 24, where both the top and bottom portions are disposed or positioned within a center section of the holding structure 24. In other embodiments, the length of the rails 26 may be extended to take up some or all of the bottom and top portions of the structure 24, such that the rails 26 have a same or similar length as the frame 22. In some embodiments, the rails 26 may be formed from the holding structure 24 such that the rails 26 and structure 24 comprise a single object or a single piece of material. In other embodiments, the rails 26 may be formed from separate materials/objects that, when formed, are attached to the structure 24 using any suitable attachment means. The rails 26 may be formed of, or coated (entirely or partially) with a material (or suitable combination of materials) having a low or minimal coefficient of friction, such as polytetrafluoroethylene (PTFE), silicone, graphite, glass, molybdenum disulfide (MoS2), tungsten disulfide (WS2), electroless nickel plating, and/or the like.

In the embodiment shown by FIG. 3, the diffuser frame 22 includes a tab 22T on a side of the frame 22, which is used to couple/attach the frame 22 with the spring 12. In some embodiments, the tab 22T may be formed from a same material/object from which frame 22 is formed such that the tab 22T and frame 22 comprise a single object or a single piece of material. In other embodiments, the tab 22T may be formed from a separate piece of material or a separate object, which may be attached to the frame 22 using any suitable attachment means.

The tab 22T includes a slot 28 or other like opening configured to receive a portion of the second end 19 of the spring 12. In this way, the diffuser frame 22 is connected/coupled to the torsion spring 12 through a slot 28 (or other like opening) of tab 22T. In the embodiment shown by FIG. 3, the slot 28 is configured to receive a tip of the second end 19 of the spring 12; in other words, the tip of second end 19 may be inserted into slot 28. A more detailed view of this configuration is shown by FIG. 4A. In the embodiment of FIG. 3, the second end 19 is bent to form the tip so that the tip of the second end 19 may slide inside (or be inserted) into the slot 28. Other connection means may be used to couple the second end 19 of the spring 12 with the frame 22 in other embodiments. For example, in some embodiments, diffuser frame 22 may be omitted and the second end 19 of the spring 12 may be directly connected or attached to the diffuser element 10 by any means without the frame 22.

Coils of the spring 12 are centered around an axis 14 fixed on the holding structure 24. In some embodiments, the axis 14 may be a cylinder formed from the holding structure 24 such that the axis (cylinder) 14 and structure 24 comprise a single object or a single piece of material. In other embodiments, the axis (cylinder) 14 may be formed from separate piece of material or object, which may be attached to the holding structure 24 using any suitable attachment means.

Figure 4B:
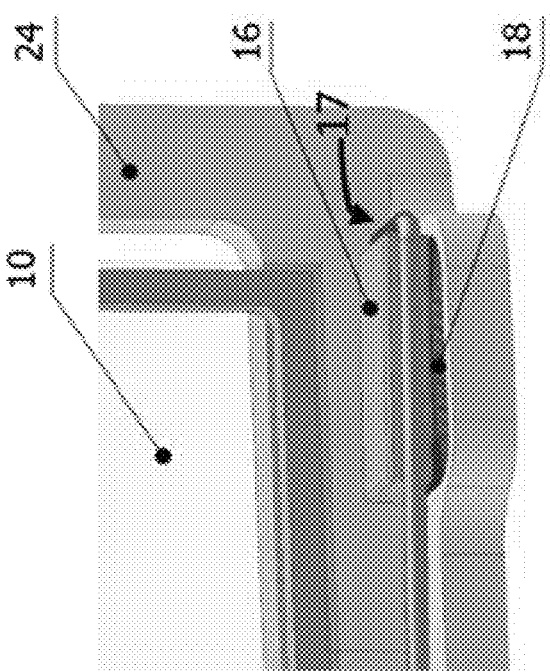
FIG. 4B is a close-up view of actuation means used in the embodiment of FIG. 3.
Figure 4A:
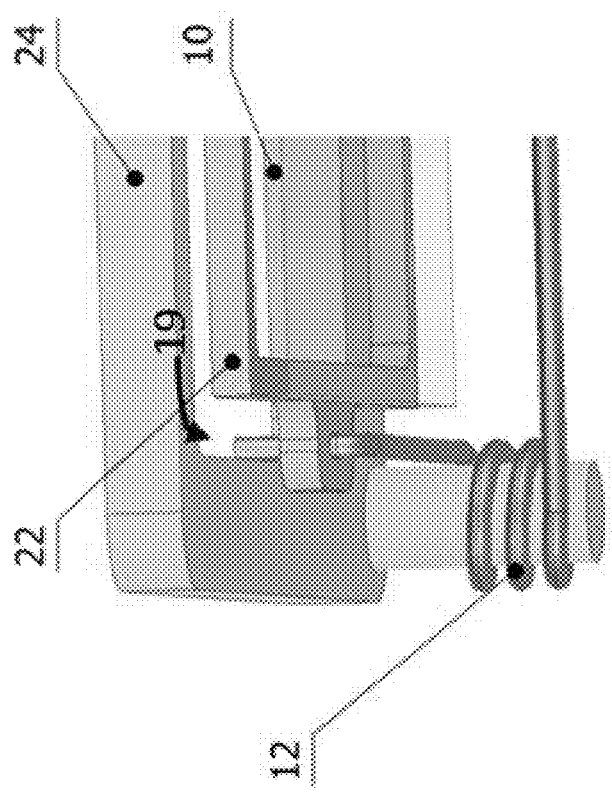
FIG. 4A depicts a close-up view of a torsion spring used in the embodiment of FIG. 3.

In addition, the limits of the speckle diffuser motion may be set or otherwise controlled by means of the torsion spring geometry, as is illustrated by FIGS. 4A and 4B, where close-up views of different sections of the device 100 are shown in its boundary positions.

FIG. 4A depicts a close-up view of the torsion spring 12 (and axis 14) of the embodiment shown by FIG. 3. In the embodiment of FIGS. 3 and 4, the tip of the second end 19 is used as a limiter of the diffuser element 10 during oscillation/vibration/motion. As shown by FIG. 4A, the frame 22 is set back from the structure 24. In the embodiment shown by FIG. 4A, the tip formed from the second end 19 reaches or comes into contact the an inner portion of the structure 24 during oscillation/vibration of the diffuser element 10. In this way, the tip formed from the second end 19 may be used in place of the limiter 20A shown and described with respect to FIGS. 1 and 2.

FIG. 4B depicts a close-up view of the torsion spring 12 (and electromagnet 18) of the embodiment shown by FIG. 3. In the embodiment of FIGS. 3 and 4B, the first end 17 and/or in combination with the magnet 16 are used as a limiter of the diffuser element 10 during oscillation/vibration/motion. As discussed previously, the magnet 16 may touch or otherwise come into contact with the electromagnet 18 during an attraction phase of the actuation. In the embodiment shown by FIG. 4B, the first end 17 and/or magnet 16 reaches or comes into contact with the electromagnet 18 during oscillation/vibration of the diffuser element 10. In this embodiment, after the magnet 16 is released from the electromagnet 18, the first end 17 and/or magnet 16 may repeatedly move away from and then towards (and/or contact) the electromagnet 18 in proportion to the oscillation/vibration frequency. In this way, the first end 17 may be used in place of the limiter 20B shown and described with respect to FIGS. 1 and 2.

Figure 5:
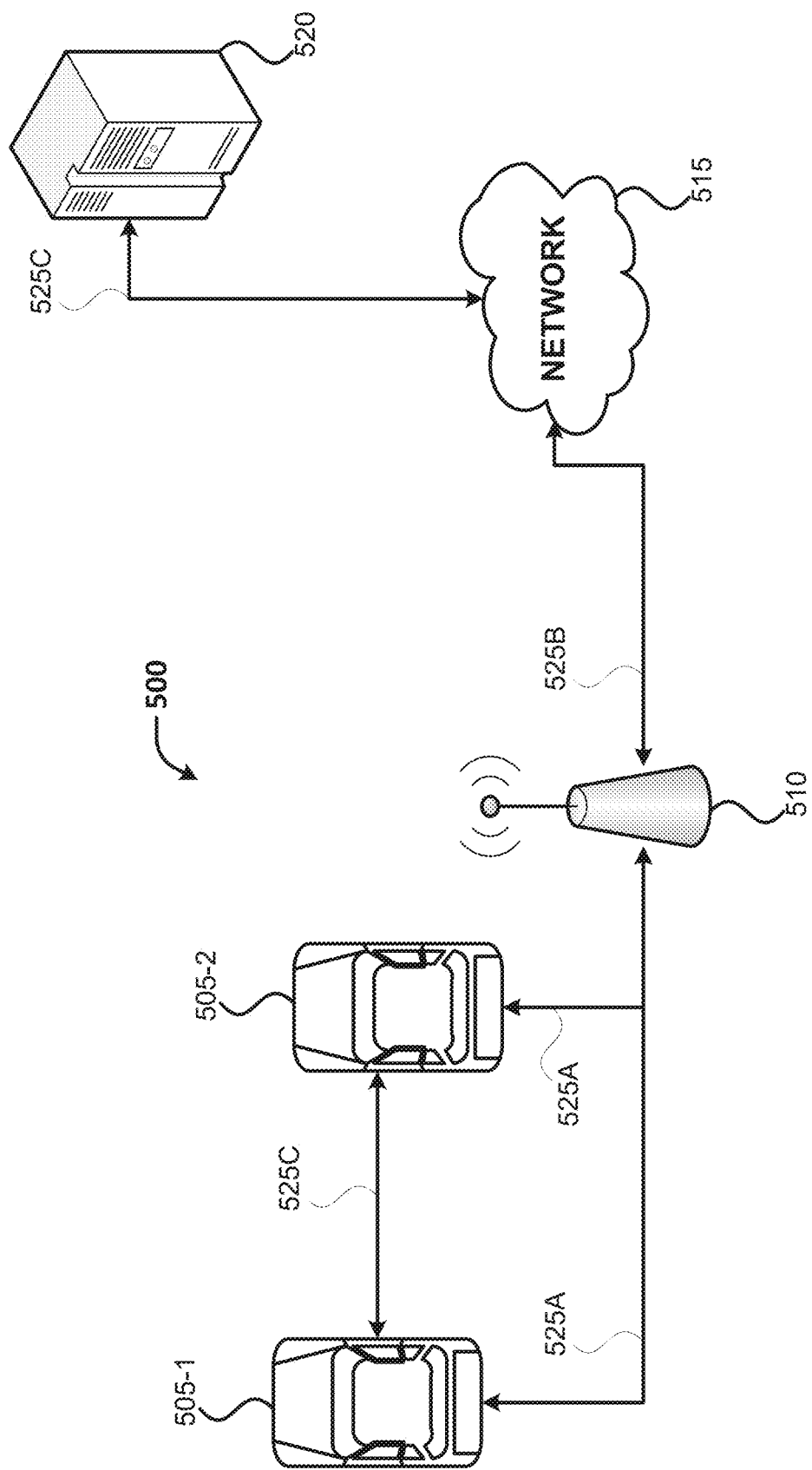
FIG. 5 illustrates an environment in which various embodiments may be practiced.

FIG. 5 illustrates an environment 500 in which various embodiments may be practiced. Environment 500 includes vehicles 505-1 and 505-2 (collectively referred to as "vehicle 505" or "vehicles 505"), a wireless access node 510, and a network 515. The vehicles 505 may be any type of motorized vehicle or device used for transportation of people or goods, which may be equipped with controls used for driving, parking, passenger comfort and/or safety, etc. The terms "motor," "motorized," etc. as used herein may refer to devices that convert one form of energy into mechanical energy, and may include internal combustion engines (ICE), compression combustion engines (CCE), electric motors, and hybrids (e.g., including an ICE/CCE and electric motor(s)). Although FIG. 5 shows only two vehicles 505, each vehicle 505 may represent a plurality of individual motor vehicles of varying makes, models, trims, etc.

Vehicles 505 may include a vehicle-embedded computer device (VECD) (e.g., VECD 600 shown and described with regard to FIG. 6) incorporated with the holographic HUD technology of the present disclosure to display vehicle information or other data to an operators/drivers of the vehicles 505. According to various embodiments, the VECDs of the vehicles 505 may obtain and/or process data from various sources, and the processed data may be displayed by respective holographic HUD devices employed by each vehicle 505 according to the various embodiments discussed herein.

The VECD included with the vehicle 505 is any type of computer device that is mounted on, built into, or otherwise embedded in a vehicle and is capable of recording, storing, and/or transferring digital data to/from other computer devices. In embodiments, the VECD may be implemented in or as an in-vehicle infotainment (IVI), in-car entertainment (ICE) device, an Instrument Cluster (IC), head-up display (HUD) device, onboard diagnostic (OBD) device, dashtop mobile equipment (DME), mobile data terminal (MDT), Electronic Engine Management System (EEMS), electronic/engine control unit (ECU), electronic/engine control module (ECM), embedded systems, microcontrollers, control modules, engine management systems (EMS), etc.

The VECD may include one or more processors (having one or more processor cores and optionally, one or more hardware accelerators), memory devices, communication devices, etc. that are configured to carry out various functions according to the various embodiments discussed herein. The VECD may obtain sensor data from one or more sensors embedded in the vehicle 505, data packets from other VECDs included in other vehicles 505 (e.g., data packets may be obtained by a VECD of vehicle 505-1 from a VECD of vehicle 505-2), data packets and/or data streams from network 515 and/or network infrastructure (e.g., core network elements of a cellular communications network, servers of a cloud computing service, etc.), navigation signaling/data from on-board navigations systems (e.g., global navigation satellite system (GNSS), global positioning system (GPS), etc.), and/or the like. In embodiments, the VECD may also include, or operate in conjunction with communications circuitry, and/or input/output (I/O) interface circuitry in order to obtain the data for the various sources.

The communications circuitry of the vehicles 505 may enable the VECDs to directly exchange data via link 525C. Link 525C may be a short range radio link for direct intra-mobile device communications, which may operate in accordance with a suitable wireless communication protocol, such as cellular vehicle-to-vehicle (V2V) or vehicle-to-everything (V2X) specifications provided by the Third Generation Partnership Project (3GPP) New Radio (NR) and/or Long Term Evolution (LTE) standards, Direct Short Range Communications (DSRC) and/or Wireless Access in Vehicular Environments (WAVE) specified by IEEE 802.11p and IEEE 1609.4, respectively, or some other suitable standard or combination(s) thereof. Other short range communications protocols may be used, such as Zigbee®, Bluetooth® or Bluetooth Low Energy (BLE), IEEE 802.15.4 (6LoW-PAN), WiFi-direct, ANT or ANT+; 3GPP device-to-device (D2D) or Proximity Services (ProSe); Z-Wave (also known as "Zig-Wave"); Linear; SigFox; etc.

The communications circuitry of the vehicles 505 may communicate with the network 515 via the wireless access node 510. The wireless access node 510 may be a network element comprising one or more hardware computer devices configured to provide wireless communication services to mobile devices within a coverage area or cell associated with the wireless access node 510. The wireless access node 510 may include transmitter(s)/receiver(s) (or alternatively, transceiver(s)) connected to one or more antennas elements, one or more memory devices, one or more processors, one or more network interface controllers, and/or other like components. The transmitters/receivers may be configured to transmit/receive data signals to/from one or more mobile devices via a link (e.g., links 525A). Furthermore, the network interface controllers may be configured to transmit/receive with various network elements (e.g., one or more servers within a core network, etc.) over another backhaul connection (e.g., link 525B). In embodiments, the VECD of each vehicle 505 may generate and transmit data to the wireless access node 510 over respective links 525A, and the wireless access node 510 may provide the data to the network 515 over backhaul link 525B. Additionally, during operation of the vehicle 505, the wireless access node 510 may obtain data intended for the VECD from the network 515 over link 525B, and may provide that data to the VECD over link 525A. The communications circuitry in the vehicle 505 may communicate with the wireless access node 510 in accordance with one or more wireless communications protocols as discussed herein.

As an example, the wireless access node 510 may be a base station associated with a cellular network (e.g., an evolved NodeB (eNB) in an LTE network, a next generation NodeB (gNB) in a new radio (NR) or fifth generation (5G) cellular network, a WiMAX base station, etc.), an Road Side Unit (RSU), a remote radio head, a relay radio device, a smallcell base station (e.g., a femtocell, picocell, Home eNB (HeNB), and the like), or other like network element.

In embodiments where the wireless access node 510 is a cellular base station, the wireless access node 510 may be deployed outdoors to provide communications for the vehicle 505 when the vehicle 505 is operating at large, for example when deployed on public roads, streets, highways, etc.

In embodiments where the wireless access node 510 is an RSU, the wireless access node 510 is a transportation infrastructure element implemented in or by an gNB (a "gNB-type RSU"), an eNB (an "eNB-type RSU"), a relay node, or a stationary (or relatively stationary) user device (a "UE-type RSU"). The RSU 510 is a computing device coupled with radiofrequency (RF) circuitry located on a roadside that provides connectivity support to passing vehicles 505. The RSU 510 may also include internal data storage circuitry to store intersection map geometry, traffic statistics, media, as well as applications/software to sense and control on-going vehicular and pedestrian traffic. The RSU 510 may operate on the 5.9 GHz Direct Short Range Communications (DSRC) band to provide very low latency communications required for high speed events, such as crash avoidance, traffic warnings, and the like. In addition, the RSU 510 may operate as a WiFi hotspot (2.4 GHz band) and/or provide connectivity to one or more cellular networks to provide uplink and downlink communications. The computing device and some or all of the RF circuitry of the RSU 510 may be packaged in a weatherproof enclosure suitable for outdoor installation, and may include a network interface controller to provide a wired (e.g., Ethernet) connection to a traffic signal controller requiring and/or a backhaul network.

In some embodiments, the wireless access node 510 may be a network appliance, such as a gateway (GW) device, that may include one or more processors, communications systems (e.g., including network interface controllers, one or more transmitters/receivers connected to one or more antennas, and the like), and computer readable media. In such embodiments, the GW may be a wireless access point (WAP), a home/business server (with or without RF communications circuitry), a router, a switch, a hub, a radio beacon, and/or any other like network device. In embodiments where the wireless access node 510 is a GW, the wireless access node 510 may be deployed in an indoor setting, such as a garage, factory, laboratory or testing facility, and may be used to provide communications for while parked, prior to sale on the open market, or otherwise not operating at large.

Network 515 may comprise computers, network connections among the computers, and software routines to enable communication between the computers over network connections. In this regard, the network 515 may each comprise one or more network elements that may include one or more processors, communications systems (e.g., including network interface controllers, one or more transmitters/receivers connected to one or more antennas, etc.), and computer readable media. Examples of such network elements may include WAPs, a home/business server (with or without RF communications circuitry), routers, switches, hubs, radio beacons, base stations, picocell or small cell base stations, and/or any other like network device. Connection to the network 515 may be via a wired or a wireless connection using the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. More than one network may be involved in a communication session between the illustrated devices. Connection to the network 515 may require that the computers execute software routines which enable, for example, the seven layers of the OSI model of computer networking or equivalent in a wireless (cellular) phone network.

The network 515 may be used to enable relatively long-range communication such as, for example, between the server(s) 520 and one or more vehicles 505. The network 515 may represent the Internet, one or more cellular networks, a local area network (LAN) or a wide area network (WAN) including proprietary and/or enterprise networks, Transfer Control Protocol (TCP)/Internet Protocol (IP)-based network, or combinations thereof. Examples of such networks and/or protocols are discussed elsewhere herein. In such embodiments, the network 515 may be associated with network operator who owns or controls equipment and other elements necessary to provide network-related services, such as one or more base stations or access points, one or more servers for routing digital data or telephone calls (for example, a core network or backbone network), etc.

The one or more servers 520 is/are hardware computing devices that may include one or more systems and/or applications for providing one or services to users (e.g., users or vehicles 505) over a network (e.g., network 515). The server(s) 520 include one or more processors, one or more memory devices, one or more network interfaces, and/or other like components. Additionally, the server(s) 520 may be a single physical hardware device, or may be physically or logically connected with other network devices, and the server(s) 520 may be connected to, or otherwise associated with one or more data storage devices (not shown). The server(s) 520 may include an operating system (OS) that may provide executable program instructions for the general administration and operation of servers, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 520 is/are elements offering applications/services for vehicles 505 that use IP resources. The server(s) 520 can also be configured to support one or more communication services (e.g., VoIP sessions, PTT sessions, group communication sessions, social networking services, etc.) for the vehicles 505 via the network 515.

The applications/services provided by the server(s) 520 may include providing basic safety messages (e.g., collision warnings, emergency warnings, pre-crash warnings, traffic warnings, and the like), SMS/MMS messages, navigation system information (e.g., maps, turn-by-turn indicator arrows), content (e.g., audio, video, etc.), and/or gaming experiences. This data/information may then be displayed by an optical system of each vehicle 505 (see e.g., FIG. 6 infra), and such an optical system may include a speckle diffusion apparatus as discussed herein. The server(s) 520 may also perform or facilitate user setup and registration for obtaining the services, initiate and control software and/or firmware updates of the vehicles 505 or computer devices and/or sensors within or attached to the vehicles 505, record/store data obtained from the vehicles 505 (or components within the vehicles 505), perform user authentication and verification, provide content management, provide user interfaces and/or control elements for obtaining the services, and/or perform computationally intensive tasks for the components/devices within vehicles 505.

Figure 6:
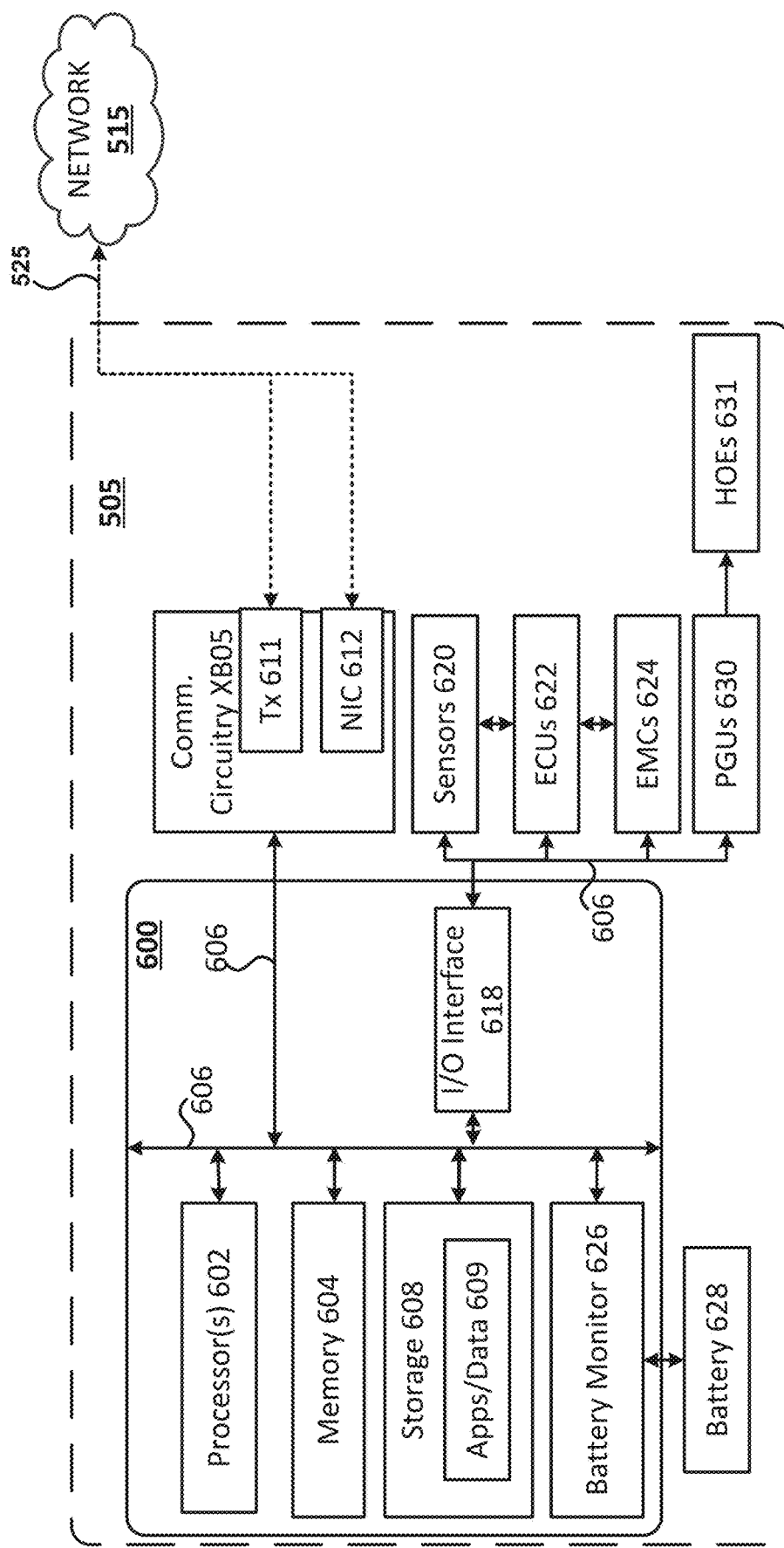
FIG. 6 illustrates an example implementation of a vehicle embedded computer device in accordance with various embodiments.

FIG. 6 illustrates an example implementation of a VECD 600, in accordance with various embodiments. FIG. 6 shows a block diagram of an example of components that may be present in a vehicle 505 and a VECD 600. The VECD 600 may include any combinations of the components as shown, which may be implemented as integrated circuits (ICs) or portions thereof, discrete electronic devices, or other modules, logic, hardware, software, firmware, middleware or a combination thereof adapted in the VECD 600, or as components otherwise incorporated within a chassis of a larger system.

The VECD 600 may be an embedded system or any other type of computer device discussed herein. In another example, the VECD 600 may be a separate and dedicated and/or special-purpose computer device designed specifically to carry out holographic HUD solutions of the embodiments discussed herein.

The VECD 600 may include processor circuitry 602 may be one or more processing elements/devices configured to perform basic arithmetical, logical, and input/output operations by carrying out instructions. Processor circuitry 602 may be implemented as a standalone system/device/package or as part of an existing system/device/package (e.g., an ECU/ECM, EEMS, etc.) of the vehicle 505. As examples, the processor circuitry 602 may include one or more central processing unit (CPU) processor cores, one or more application processors, one or more graphics processor units (GPUs), one or more reduced instruction set computing (RISC) processors, one or more Acorn RISC Machine (ARM) processors, one or more complex instruction set computing (CISC) processors, one or more digital signal processors (DSPs), one or more one or more field-programmable devices (e.g., hardware accelerators), one or more application specific integrated circuits (ASICs), one or more baseband processors, one or more radio-frequency integrated circuits (RFICs), one or more ultra-low voltage processors, one or more microprocessors or controllers (e.g., ECUs or the like), or any suitable combination thereof. The field-programmable devices (hardware accelerators) may include, for example, field-programmable gate arrays (FPGAs), structured/programmable ASICs, programmable SoCs (PSoCs), etc., any other suitable processor or processing/controlling circuit(s), or combinations thereof. The processor circuitry 602 may be a part of a system on a chip (SoC), System-in-Package (SiP), or the like in which the processor circuitry 602 and other components discussed herein are formed into a single IC or a single package.

In embodiments, the processor circuitry 602 may include a sensor hub, which may act as a coprocessor by processing data obtained from the sensors 620. The sensor hub may include circuitry configured to integrate data obtained from each of the sensors 620 by performing arithmetical, logical, and input/output operations. In embodiments, the sensor hub may capable of timestamping obtained sensor data, providing sensor data to the processor circuitry 602 in response to a query for such data, buffering sensor data, continuously streaming sensor data to the processor circuitry 602 including independent streams for each sensor 322, reporting sensor data based upon predefined thresholds or conditions/triggers, and/or other like data processing functions.

The memory circuitry 604 may be circuitry configured to store data or logic for operating the VECD 600. Memory circuitry 604 may include number of memory devices may be used to provide for a given amount of system memory. As examples, the memory circuitry 604 can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, antifuses, etc.) that may be configured in any suitable implementation as are known.

Where FPDs are used, the processor circuitry 602 and memory circuitry 604 (and/or storage device 608) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs) that are used by the processor circuitry 602 to implement various logic functions. The memory cells may include any combination of various levels of memory/storage including, but not limited to, EPROM, EEPROM, flash memory, SRAM, anti-fuses, etc.

Data storage circuitry 608 (with shared or respective controllers) may provide for persistent storage of information such as data/applications 609, operating systems, etc. The storage circuitry 608 may be implemented as solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor circuitry 602; hard disk drives (HDDs); micro HDDs; resistance change memories; phase change memories; holographic memories; or chemical memories; among others. As shown, the storage circuitry 608 is included in the VECD 600; however, in other embodiments, storage circuitry 608 may be implemented as one or more separate devices that are mounted in vehicle 505 separate from the other elements of VECD 600.

In some embodiments, the storage circuitry 608 may include an operating system (OS) (not shown), which may be a general purpose operating system or an operating system specifically written for and tailored to the VECD 600. The OS may include one or more drivers, libraries, and/or application programming interfaces (APIs), which provide program code and/or software components for applications/data 609 and/or control system configurations to control and/or obtain/process data from one or more sensors 620, ECUs 622, and/or EMCs 624. The applications/data 609 may be software modules/components used to perform various functions of the VECD 600 and/or to carry out functions of the example embodiments discussed herein. In addition, the applications/data 609 may comprise information to be displayed using the holographic HUD device(s) of the embodiments discussed herein. In embodiments where the processor circuitry 602 and memory circuitry 604 includes hardware accelerators (e.g., FPGA cells) as well as processor cores, the hardware accelerators (e.g., the FPGA cells) may be pre-configured (e.g., with appropriate bit streams, logic blocks/fabric, etc.) with the logic to perform some functions of the embodiments herein (in lieu of employment of programming instructions to be executed by the processor core(s)).

The components of VECD 600 and/or vehicle 505 may communicate with one another over the bus 606. In various embodiments, bus 606 may be a controller area network (CAN) bus system, a Time-Trigger Protocol (TTP) system, or a FlexRay system, which may allow various devices (e.g., ECUs 622, sensors 620, EMCs 624, etc.) to communicate with one another using messages or frames. Suitable implementations and general functionality of CAN, TTP, and FlexRay bus systems are known, and are readily implemented by persons having ordinary skill in the art. Additionally or alternatively, the bus 606 may include any number of technologies, such as a Local Interconnect Network (LIN); industry standard architecture (ISA); extended ISA (EISA); Peripheral Component Interconnect Express (PCI); PCI extended (PCIx); PCI express (PCIe); an Inter-Integrated Circuit (I2C) bus; a Parallel Small Computer System Interface (SPI) bus; point to point interfaces; a power bus; a proprietary bus, for example, used in a SoC based interface; or any number of other technologies.

The communication circuitry 605 may include circuitry for communicating with a wireless network or wired network. For example, the communications system 205 may include transceiver (Tx) 311 and network interface controller (NIC) 612. NIC 612 may be included to provide a wired communication link to the network 515 and/or other devices. The wired communication may provide an Ethernet connection, an Ethernet-over-USB, and/or the like, or may be based on other types of networks, such as DeviceNet, ControlNet, Data Highway+, PROFIBUS, or PROFINET, among many others. An additional NIC 612 may be included to allow connect to a second network (not shown) or other devices, for example, a first NIC 612 providing communications to the network 515 over Ethernet, and a second NIC 612 providing communications to other devices over another type of network, such as a personal area network (PAN) including a personal computer (PC) device.

The Tx 611 may include one or more radios to wirelessly communicate with the network 515 and/or other devices. The Tx 611 may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of VECD 600.

Communication circuitry 605 may include one or more processors (e.g., baseband processors, modems, etc.) that are dedicated to a particular wireless communication protocol (e.g., Wi-Fi and/or IEEE 802.11 protocols), a cellular communication protocol (e.g., 5th Generation (5G) communication systems, Long Term Evolution (LTE), WiMAX, Groupe Speciale Mobile Association (GSMA), and the like), a wireless personal area network (WPAN) protocol (e.g., IEEE 802.15.4-802.15.5 protocols, Open Mobile Alliance (OMA) protocols, Bluetooth or Bluetooth low energy (BLE), etc.), and/or a wired communication protocol (e.g., Ethernet, Fiber Distributed Data Interface (FDDI), Point-to-Point (PPP), etc.).

The input/output (I/O) interface 618 may include circuitry, such as an external expansion bus (e.g., Universal Serial Bus (USB), FireWire, PCIe, Thunderbolt, etc.), used to connect VECD 600 with external components/devices, such as sensors 620, electronic control units (ECUs) 622, electro-mechanical components (EMCs) 624, and picture generation units (PGUs) 630. I/O interface circuitry 618 may include any suitable interface controllers and connectors to interconnect one or more of the processor circuitry 602, memory circuitry 604, storage circuitry 608, communication circuitry 605, and the other components of VECD 600. The interface controllers may include, but are not limited to, memory controllers, storage controllers (for example, redundant array of independent disk (RAID) controllers, baseboard management controllers (BMCs), input/output controllers, host controllers, etc. The connectors may include, for example, busses (for example, bus 606), ports, slots, jumpers, interconnect modules, receptacles, modular connectors, etc.

Sensors 620 may be any device, module, or subsystem configured to detect events or environmental changes, convert the detected events into electrical signals and/or digital data, and transmit/send the signals/data (sensor data) about the detected events to some other a device, module, subsystem, (e.g., the VECD 600, one or more ECUs 622, one or more EMCs 624, etc.). Some of the sensors 620 may be sensors used for various vehicle control systems, and may include, inter alia, exhaust sensors including exhaust oxygen sensors to obtain oxygen data and manifold absolute pressure (MAP) sensors to obtain manifold pressure data; mass air flow (MAF) sensors to obtain intake air flow data; intake air temperature (IAT) sensors to obtain IAT data; ambient air temperature (AAT) sensors to obtain AAT data; ambient air pressure (AAP) sensors to obtain AAP data; catalytic converter sensors including catalytic converter temperature (CCT) to obtain CCT data and catalytic converter oxygen (CCO) sensors to obtain CCO data; vehicle speed sensors (VSS) to obtain VSS data; exhaust gas recirculation (EGR) sensors including EGR pressure sensors to obtain ERG pressure data and EGR position sensors to obtain position/orientation data of an EGR valve pintle; Throttle Position Sensor (TPS) to obtain throttle position/orientation/angle data; a crank/cam position sensors to obtain crank/cam/piston position/orientation/angle data; coolant temperature sensors; and/or other like sensors embedded in vehicles 505. The sensors 620 may include other sensors such as an accelerator pedal position sensor (APP), accelerometers, magnetometers, level sensors, flow/fluid sensors, barometric pressure sensors, and the like.

Some of the sensors 620 may be sensors used for other systems of the vehicle, such as navigation, autopilot systems, object detection, and/or the like. Examples of such sensors 620 may include, inter alia, inertia measurement units (IMU) comprising accelerometers, gyroscopes, and/or magnetometers; one or more microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; outward and inward facing image capture devices (e.g., cameras); light detection and ranging (LiDAR) sensors; proximity sensors (e.g., infrared radiation detector and the like), depth sensors, ambient light sensors, ultrasonic transceivers; one or more microphones; positioning circuitry; and so forth. The positioning circuitry may also be part of, or interact with, the communication circuitry 605 to communicate with components of a positioning network, such as a GNSS and/or GPS. In some embodiments, the positioning circuitry may be a Micro-Technology for Positioning, Navigation, and Timing (Micro-PNT) IC that uses a master timing clock to perform position tracking/estimation without GNSS and/or GPS.

Individual ECUs 622 may be embedded systems or other like computer devices that control a corresponding system of the vehicle 505. In embodiments, individual ECUs 622 may each have the same or similar components as the VECD 600, such as a microcontroller or other like processor device, memory device(s), communications interfaces, and the like. In embodiments, the ECUs 622 may include, inter alia, a Drivetrain Control Unit (DCU), an Engine Control Unit (ECU), an Engine Control Module (ECM), EEMS, a Powertrain Control Module (PCM), a Transmission Control Module (TCM), a Brake Control Module (BCM) including an anti-lock brake system (ABS) module and/or an electronic stability control (ESC) system, a Central Control Module (CCM), a Central Timing Module (CTM), a General Electronic Module (GEM), a Body Control Module (BCM), a Suspension Control Module (SCM), a Door Control Unit (DCU), a Speed Control Unit (SCU), a Human-Machine Interface (HMI) unit, a Telematic Control Unit (TTU), a Battery Management System (which may be the same or similar as battery monitor 626) and/or any other entity or node in a vehicle system. In some embodiments, the one or more of the ECUs 622 and/or VECD 600 may be part of or included in a Portable Emissions Measurement Systems (PEMS).

The EMCs 624 may be devices that allow VECD 600 to change a state, position, orientation, move, and/or control a mechanism or system. The EMCs 624 may include one or more switches, actuators (e.g., valve actuators, fuel injectors, ignition coils, etc.), motors, thrusters, and/or other like electro-mechanical components. In embodiments, VECD 600 and/or ECUs 622 may be configured to operate one or more EMCs 624 by transmitting/sending instructions or control signals to the EMCs 624 based on detected events. Individual ECUs 622 may be capable of reading or otherwise obtaining sensor data from one or more sensors 620, processing the sensor data to generate control system data, and providing the control system data to the VECD 600 for processing. The control system information may be a type of state information discussed previously. For example, an ECM or ECU may provide engine revolutions per minute (RPM) of an engine of the vehicle 505, fuel injector activation timing data of one or more cylinders and/or one or more injectors of the engine, ignition spark timing data of the one or more cylinders (e.g., an indication of spark events relative to crank angle of the one or more cylinders), transmission gear ratio data and/or transmission state data (which may be supplied to the EMC/ECU by the TCU), real-time calculated engine load values from the ECM, etc.; a TCU may provide transmission gear ratio data, transmission state data, etc.; and the like.

One or more optical systems may also be included in the vehicle 505. Such an optical system comprises PGUs 630 and one or more optical elements (e.g., lenses, filters, beam splitters, diffraction gratings, etc.), and one or more combiner elements (or "combiners"). Optical elements that are used to produce holographic images may be referred to as holographic optical elements (HOEs). An example of an optical system that includes HOEs is a head-up display (HUD) system.

In HUD systems, each of the PGUs 630 include a projection unit (or "projector") and a computer device. The computer device comprises one or more electronic elements that create/generate digital content to be displayed by the projection unit. The computer device may be the processor circuitry 602, or a similar processing device as discussed previously. The digital content (e.g., text, images, video, etc.) may be any type of content stored by the storage circuitry 608, streamed from server(s) 520 and/or remote devices via the communication circuitry 605, and/or based on outputs from various sensors 620, ECUs 622, and/or EMCs 624. The content to be displayed may include, for example, safety messages (e.g., collision warnings, emergency warnings, pre-crash warnings, traffic warnings, and the like), Short Message Service (SMS)/Multimedia Messaging Service (MMS) messages, navigation system information (e.g., maps, turn-by-turn indicator arrows), movies, television shows, video game images, and the like.

The projection unit (or "projector") is a device or system that projects still or moving images onto the surface(s) of HOEs via one or more reflection surfaces (e.g., mirrors) based on signals received from the computer device. The projection unit may include a light generator (or light source) to generate light based on the digital content, which is focused or (re)directed to one or more HOEs (e.g., display surface(s)). The projection unit may include various electronic elements (or an electronic system) that convert the digital content, or signals obtained from the computer device, into signals for controlling the light source to generate/output light of different colors and intensities. As examples, a projector of each PGU may be a light emitting diode (LED) projector, a laser diode projector, a liquid crystal display (LCD) projector, a digital light processing (DLP) projector, a liquid crystal on silicon (LCoS) projector, and/or any other like projection device.

In some implementations, the projection unit may include a collimator (e.g., a one or more lenses, apertures, etc.) to change diverging light from the light source into a parallel beam. In some implementations, the projector may include a combiner (also referred to as "combiner optic" and the like), which may combine different light paths into one light path to define a palette of colors. In some embodiments, the projection unit may comprise scanning mirrors that copy the image pixel-by-pixel and then project the image for display.

In some embodiments, the HUD system or the PGUs 630 may comprise a relay lens assembly and a combiner element (which may be different than the combiner used for displaying the projected image). The relay lens assembly may comprise one or more relay lenses, which re-image images from the projector into an intermediate image that then reaches an HOE 631 (e.g., the combiner element) through a reflector.

The generated light may be combined or overlapped with external (e.g., natural) light that is also (re)directed to the same HOE. The HOE that combines the generated light with the external light may be referred to as a "combiner element" or "combiner." The combiner may be a beam splitter or semi-transparent display surface located directly in front of the viewer (e.g., operator of vehicle 505), that redirects the projected image from projector in such a way as to see the field of view and the projected image at the same time. In addition to reflecting the projected light from the projector unit, the combiner element also allows other wavelengths of light to pass through the combiner. In this way, the combiner element (as well as other HOEs 631) mixes the digital images output by the projector with a viewed real-world to facilitate augmented reality.

The combiner may be formed or made of one or more a pieces of glass, plastic, or other similar material, and may have a coating that enables the combiner to reflect the projected light while allowing external (natural) light to pass through the combiner. In embodiments, the combiner element may be a windshield of the vehicle 505, a separate semi-reflective surface mounted to a dashboard of the vehicle 505, or the like. The combiner may have a flat surface or a curved surface (e.g., concave or convex) to aid in focusing the projected image. One or more of the HOEs 631 may be transmissive optical elements, where the transmitted beam (reference beam) hits the HOE 631 and the diffracted beam(s) go through the HOE 631. One or more HOEs 631 may be reflective optical elements, where the transmitted beam (reference beam) hits the HOE 631 and the diffracted beam(s) reflects off of the HOE 631 (e.g., the reference beam and diffracted beams are on the same side of the HOE 631).

In various embodiments, the speckle diffuser 100 (or at least the diffuser element 10) is disposed or otherwise placed somewhere between the projector (or light emitting device) and an HOE 631 or display surface. For example, the speckle diffuser 100 (or at least the diffuser element 10) may be disposed or otherwise placed between the projector (or light emitting device) and the combiner element, or the speckle diffuser 100 (or at least the diffuser element 10) may be disposed or otherwise placed between the projector (or light emitting device) and the relay lens assembly.

Additionally, one or more of the HOEs 631 may use waveguide holographic techniques to progressively extract a collimated image guided by total internal reflection (TIR) in a waveguide pipe. The waveguide pipe may be a thin sheet of glass or plastic through which the generated light bounces to route the generated light to the viewer/user. In some embodiments, the HOEs 631 may utilize holographic diffraction grating (e.g., Bragg diffraction grating) to provide the generated light to the waveguide at a critical angle, which travels through the waveguide. The light is steered toward the user/viewer by one or more other HOEs 631 that utilize holographic diffraction grating. These HOEs 631 may comprise grooved reflection gratings and/or a plurality of layers of alternating refraction indexes (e.g., comprising liquid crystals, photoresist substrate, etc.); the grooved reflection gratings and/or the refractive index layers may provide constructive and destructive interference and wavelet dispersion.

The battery 628 may power the VECD 600. In embodiments, the battery 628 may be a typical lead-acid automotive battery, although in some embodiments, such as when vehicle 505 is a hybrid vehicle, the battery 628 may be a lithium ion battery, a metal-air battery, such as a zinc-air battery, an aluminum-air battery, a lithium-air battery, a lithium polymer battery, and the like. The battery monitor 626 may be included in the VECD 600 to track/monitor various parameters of the battery 628, such as a state of charge (SoCh) of the battery 628, state of health (SoH), and the state of function (SoF) of the battery 628. The battery monitor 626 may include a battery monitoring IC, which may communicate battery information to the processor circuitry 602 over the bus 606.

While not shown, various other devices may be present within, or connected to, the VECD 600. For example, I/O devices, such as a display, a touchscreen, or keypad may be connected to the VECD 600 via bus 606 to accept input and display outputs. In another example, GNSS and/or GPS circuitry and associated applications may be included in or connected with VECD 600 to determine a geolocation of the vehicle 505. In another example, the communication circuitry 605 may include a Universal Integrated Circuit Card (UICC), embedded UICC (eUICC), and/or other elements/components that may be used to communicate over one or more wireless networks.

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. Examples of "computer devices," "computer systems," etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

Some non-limiting example as provided infra. The following examples pertain to further embodiments. Specifics in the examples may be used anywhere in one or more embodiments. All optional features of the apparatus(es) described herein may also be implemented with respect to a method or process.

Example 1 includes a speckle diffuser apparatus to be employed in an optical system, the apparatus comprising: a torsion spring; an interaction element coupled with a first end of the torsion spring; and a speckle diffuser element coupled with a second end of the torsion spring.

Example 2 includes the speckle diffuser apparatus of example 1 and/or some other example(s) herein, wherein the speckle diffuser element is coupled to a diffuser frame, and a portion of the diffuser frame is coupled with the second end of the torsion spring.

Example 3 includes the speckle diffuser apparatus of example 2 and/or some other example(s) herein, further comprising: an actuator configured to interact with the interaction element to cause actuation of the torsion spring.

Example 4 includes the speckle diffuser apparatus of example 3 and/or some other example(s) herein, wherein the interaction element is a permanent magnet, and the actuator is an electromagnet.

Example 5 includes the speckle diffuser apparatus of example 3 and/or some other example(s) herein, wherein the first end and/or the interaction element is to limit movement of the speckle diffuser element in at least one direction and the second end is to limit movement of the speckle diffuser element in at least one other direction.

Example 6 includes the speckle diffuser apparatus of example 2 and/or some other example(s) herein, wherein the diffuser frame comprises a slot configured to receive a tip of the second end of the torsion spring, wherein the diffuser frame is coupled with the second end by way of the tip being inserted into the slot.

Example 7 includes the speckle diffuser apparatus of example 1 and/or some other example(s) herein, wherein the first end is positioned perpendicular to the second end, or the first end is not positioned perpendicular to the second end.

Example 8 includes the speckle diffuser apparatus of example 2 and/or some other example(s) herein, further comprising: a housing to hold the torsion spring, the diffuser element, and the actuator, wherein the actuator is attached to, or embedded in, the housing.

Example 9 includes the speckle diffuser apparatus of example 8 and/or some other example(s) herein, wherein the housing comprises a cylinder, wherein at least a portion of the torsion spring is wrapped around the cylinder such that the cylinder acts as an axis of rotation for first end and the second end of the torsion spring.

Example 10 includes the speckle diffuser apparatus of example 8 and/or some other example(s) herein, wherein the housing comprises one or more rails along which the diffuser element is to move during oscillation of the diffuser element.

Example 11 includes a method for operating a speckle diffuser apparatus, wherein speckle diffuser apparatus comprises a torsion spring, an actuator, an interaction element coupled with a first end of the torsion spring, and a speckle diffuser element coupled with a second end of the torsion spring, the method comprising: activating the actuator to cause the interaction element to move toward the actuator; and deactivating the actuator to cause the interaction element to move away from the actuator during a second actuation phase, wherein deactivation of the actuator is to cause the torsion spring to oscillate such that the speckle diffuser diffuses speckle created by scattering of light.

Example 12 includes the method of example 11 and/or some other example(s) herein, wherein the interaction element comprises a permanent magnet and the actuator comprises an electromagnet.

Example 13 includes the method of example 12 and/or some other example(s) herein, wherein activating the actuator comprises supplying current to the electromagnet to produce a magnetic field that pulls the permanent magnet toward the actuator during a first actuation phase.

Example 14 includes the method of example 13 and/or some other example(s) herein, wherein deactivating the actuator comprises: restricting the supply of current to decrease the magnetic field to release the permanent magnet.

Example 15 includes the method of example 14 and/or some other example(s) herein, wherein release of the permanent magnet is to cause the diffuser element to move laterally in proportion to an oscillation frequency of the torsion spring and/or the first end.

Example 16 includes an optical system, comprising: a light emitting source to generate light based on one or more digital images; an optical element to which the generated light is to be redirected; and a speckle diffuser subassembly disposed between the light emitting source and the optical element, the speckle diffuser subassembly comprising: an electromagnet, a permanent magnet attached to a first end of a torsion spring, the permanent magnet to interact with the electromagnet to cause movement of the torsion spring, and a speckle diffusing element coupled with a second end of the torsion spring, wherein the generated light is to pass through the speckle diffusing element and diffuse speckle produced by a scattering of the generated light.

Example 17 includes the optical system of example 16 and/or some other example(s) herein, wherein: the speckle diffusing element is coupled with a frame, wherein the frame comprises a slot configured to receive a tip of the second end of the torsion spring, and the frame is coupled with the second end by way of the tip being inserted into the slot, and the permanent magnet is to limit movement of the speckle diffusing element in at least one direction and the second end is to limit movement of the speckle diffusing element in at least one other direction.

Example 18 includes the optical system of example 17 and/or some other example(s) herein, further comprising: a controller to control a supply of current to the electromagnet, wherein the controller is to: supply an amount of current to the electromagnet to produce a magnetic field that pulls the permanent magnet toward the electromagnet during a first actuation phase, and restrict the amount of current supplied to the electromagnet to cause the permanent magnet to be released from the electromagnet.

Example 19 includes the optical system of example 16 and/or some other example(s) herein, further comprising: a holding structure to hold the torsion spring, the speckle diffusing element, and the electromagnet, wherein the electromagnet is coupled to the holding structure or embedded in the holding structure, and the holding structure comprises one or more rails along which the speckle diffusing element is to move during oscillation of the speckle diffusing element.

Example 20 includes the optical system of example 19 and/or some other example(s) herein, wherein the holding structure comprises a cylinder, wherein at least a portion of the torsion spring is wrapped around the cylinder such that the cylinder acts as an axis of rotation for first end and the second end of the torsion spring.

Example 21 includes a speckle diffuser apparatus to be employed in an optical system, the apparatus comprising: movement means; interaction means coupled with a first end of the movement means; and speckle diffusion means coupled with a second end of the movement means.

Example 22 includes the speckle diffuser apparatus of example 21 and/or some other example(s) herein, wherein the speckle diffusion means is coupled to holding means, and a portion of the holding means is coupled with the second end of the movement means.

Example 23 includes the speckle diffuser apparatus of example 22 and/or some other example(s) herein, further comprising: actuation means for interacting with the interaction means to cause actuation of the movement means.

Example 24 includes the speckle diffuser apparatus of example 23 and/or some other example(s) herein, wherein the interaction means is a permanent magnet, and the actuation means is an electromagnet.

Example 25 includes the speckle diffuser apparatus of example 23 and/or some other example(s) herein, wherein the first end and/or the interaction means is for limiting movement of the speckle diffusion means in at least one direction and the second end is for limiting movement of the speckle diffusion means in at least one other direction.

Example 26 includes the speckle diffuser apparatus of example 22 and/or some other example(s) herein, wherein the holding means is for comprises reception means for receiving a portion of the second end of the movement means, wherein the holding means is coupled with the second end by way of the portion being received by the receiving means.

Example 27.0 includes the speckle diffuser apparatus of example 21 and/or some other example(s) herein, wherein the first end is positioned perpendicular to the second end.

Example 27.1 includes the speckle diffuser apparatus of example 21 and/or some other example(s) herein, wherein the first end is not positioned perpendicular to the second end Example 28.0 includes the speckle diffuser apparatus of example 22 and/or some other example(s) herein, further comprising: housing means for housing the movement means, the speckle diffusion means, and the actuation means, Example 28.1 includes the speckle diffuser apparatus of example 28.0 and/or some other example(s) herein, wherein the actuation means is attached to, or embedded in, the housing means.

Example 29.0 includes the speckle diffuser apparatus of example 28.0 or 28.1 and/or some other example(s) herein, wherein the housing means comprises attachment means for attaching the movement means to the housing means.

Example 29.1 includes the speckle diffuser apparatus of example 29.0 and/or some other example(s) herein, wherein at least a portion of the movement means is attached to the attachment means such that the attachment means comprises rotation means for acting as an axis of rotation for first end and the second end.

Example 30 includes the speckle diffuser apparatus of examples 28.0-29.1 and/or some other example(s) herein, wherein the housing means comprises track means for providing a space along which the speckle diffusion means is to move during oscillation of the speckle diffusion means.

Example 31 includes the speckle diffuser apparatus of examples 23-30 and/or some other example(s) herein, wherein the movement means is a torsion spring, and the speckle diffusion means is for destroying spatial coherence (or coherence interference) of projected light prior to reflection from a display surface.

Example 32 includes an optical system, comprising: light generation means for generating light based on one or more digital images; display means for displaying the one or more digital images based on the generated light directed to the display means; and speckle diffusion subassembly means disposed between the light emitting source and the display means, the speckle diffusion subassembly means comprising: movement means; actuation means; interaction means attached to a first portion of the movement means; and speckle diffusion means attached to a second portion of the movement means, wherein the interaction means is for interacting with the actuation means, and the actuation means is for actuating the interaction between the interaction means and the actuation means, wherein the movement means is for causing movement of the speckle diffusion means in response to the interaction between the interaction means and the actuation means, and wherein the speckle diffusion means is for diffusing speckle produced by scattering of the generated light as the generated light passes through the speckle diffusion means.

Example 33 includes the optical system of example 32 and/or some other example(s) herein, wherein the interaction means is for limiting movement of the speckle diffusion means in at least one direction and the second portion is for limiting movement of the speckle diffusion means in at least one other direction.

Example 34 includes the optical system of example 33 and/or some other example(s) herein, further comprising: control means for controlling the actuation means during a first actuation phase and a second actuation phase.

Example 35 includes the optical system of example 32 and/or some other example(s) herein, wherein, during the first actuation phase, the control means is for controlling the actuation means such that the interaction comprises pulling the interaction element towards the actuation means, and during the second actuation phase, the control means is for controlling the actuation means such that the interaction comprises releasing the interaction means or pushing the interaction means away from the actuation means.

The foregoing description of one or more implementations provides illustration and description of various example embodiment, but is not intended to be exhaustive or to limit the scope of embodiments to the precise form disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. The description is thus to be regarded as illustrative instead of limiting.

What is claimed is:

1. A speckle diffuser apparatus to be employed in an optical system, the apparatus comprising:
    a torsion spring;
    a permanent magnet coupled with a first end of the torsion spring;
    a speckle diffuser element coupled with a second end of the torsion spring; and
    an electromagnet arranged to interact with the permanent magnet to cause actuation of the torsion spring.

2. The speckle diffuser apparatus of claim 1, wherein the speckle diffuser element is coupled to a diffuser frame, and a portion of the diffuser frame is coupled with the second end of the torsion spring.

3. The speckle diffuser apparatus of claim 1, wherein the first end and/or the permanent magnet is arranged to limit movement of the speckle diffuser element in at least one direction and the second end is arranged to limit movement of the speckle diffuser element in at least one other direction.

4. The speckle diffuser apparatus of claim 2, wherein the diffuser frame comprises a slot arranged to receive a tip of the second end of the torsion spring, wherein the diffuser frame is coupled with the second end by way of the tip being inserted into the slot.

5. The speckle diffuser apparatus of claim 1, wherein the first end is positioned perpendicular to the second end, or the first end is not positioned perpendicular to the second end.

6. The speckle diffuser apparatus of claim 1, further comprising:
    a housing arranged to hold the torsion spring, the speckle diffuser element, and the electromagnet, wherein the electromagnet is attached to, or embedded in, the housing.

7. The speckle diffuser apparatus of claim 6, wherein the housing comprises a cylinder, wherein at least a portion of the torsion spring is wrapped around the cylinder such that the cylinder acts as an axis of rotation for the first end and the second end of the torsion spring.

8. The speckle diffuser apparatus of claim 6, wherein the housing comprises one or more rails along which the speckle diffuser element is to move during oscillation of the speckle diffuser element.

9. A method for operating a speckle diffuser apparatus, wherein speckle diffuser apparatus comprises a torsion spring, an actuator, an interaction element coupled with a first end of the torsion spring, and a speckle diffuser element coupled with a second end of the torsion spring, the method comprising:
    activating the actuator to cause the interaction element to move toward the actuator; and
    deactivating the actuator to cause the interaction element to move away from the actuator during a second actuation phase, wherein deactivation of the actuator is to cause the torsion spring to oscillate such that the speckle diffuser element diffuses speckle created by scattering of light.

10. The method of claim 9, wherein the interaction element comprises a permanent magnet and the actuator comprises an electromagnet.

11. The method of claim 10, wherein activating the actuator comprises supplying current to the electromagnet to produce a magnetic field that pulls the permanent magnet toward the actuator during a first actuation phase.

12. The method of claim 11, wherein deactivating the actuator comprises: restricting the supply of current to decrease the magnetic field to release the permanent magnet.

13. The method of claim 12, wherein release of the permanent magnet is to cause the diffuser element to move laterally in proportion to an oscillation frequency of the torsion spring and/or the first end.

14. An optical system, comprising:
a light emitting source arranged to generate light based on one or more digital images;
an optical element arranged to which the generated light is to be redirected; and
a speckle diffuser subassembly disposed between the light emitting source and the optical element, the speckle diffuser subassembly comprising:
an electromagnet,
a permanent magnet attached to a first end of a torsion spring, the permanent magnet arranged to interact with the electromagnet to cause movement of the torsion spring, and
a speckle diffusing element coupled with a second end of the torsion spring, wherein the generated light is to pass through the speckle diffusing element and diffuse speckle produced by a scattering of the generated light.

15. The optical system of claim 14, wherein:
the speckle diffusing element is coupled with a frame, wherein the frame comprises a slot arranged to receive a tip of the second end of the torsion spring, and the frame is coupled with the second end by way of the tip being inserted into the slot, and
the permanent magnet is arranged to limit movement of the speckle diffusing element in at least one direction and the second end is arranged to limit movement of the speckle diffusing element in at least one other direction.

16. The optical system of claim 15, further comprising:
a controller to control a supply of current to the electromagnet, wherein the controller is configured to:
supply an amount of current to the electromagnet to produce a magnetic field that pulls the permanent magnet toward the electromagnet during a first actuation phase, and
restrict the amount of current supplied to the electromagnet to cause the permanent magnet to be released from the electromagnet during a second actuation phase.

17. The optical system of claim 14, further comprising:
a holding structure arranged to hold the torsion spring, the speckle diffusing element, and the electromagnet, wherein the electromagnet is coupled to the holding structure or embedded in the holding structure, and the holding structure comprises one or more rails along which the speckle diffusing element is to move during oscillation of the speckle diffusing element.

18. The optical system of claim 17, wherein the holding structure comprises a cylinder, wherein at least a portion of the torsion spring is wrapped around the cylinder such that the cylinder acts as an axis of rotation for the first end and the second end of the torsion spring.

19. A speckle diffuser apparatus to be employed in an optical system, the apparatus comprising:
an L-shaped torsion spring coupled to a stationary cylinder, the torsion spring configured to freely rotate around the stationary cylinder;
an interaction element coupled with a first end of the torsion spring; and
a framed speckle diffuser element movable coupled with a second end of the torsion spring.

20. The speckle diffuser apparatus of claim 19, further comprising:
an actuator arranged to interact with the interaction element to cause actuation of the torsion spring.

21. The speckle diffuser apparatus of claim 20, wherein the interaction element is a permanent magnet, and the actuator is an electromagnet.

22. The speckle diffuser apparatus of claim 19, further comprising:
a diffuser frame in which the speckle diffuser element is framed, wherein the actuator is attached to, or embedded in, the diffuser frame, and a portion of the diffuser frame is movably coupled with the second end of the torsion spring via a slot-tip connection.

23. The speckle diffuser apparatus of claim 22, wherein the slot-tip connection of the diffuser frame comprises a slot arranged to receive a tip of the second end of the torsion spring, wherein the diffuser frame is coupled with the second end by way of the tip being inserted into the slot.

24. The speckle diffuser apparatus of claim 19, wherein the first end and/or the interaction element is arranged to limit movement of the speckle diffuser element in at least one direction and the second end is arranged to limit movement of the speckle diffuser element in at least one other direction.

25. The speckle diffuser apparatus of claim 19, wherein the first end is positioned substantially perpendicular to the second end, or the first end is not positioned parallel to the second end.

26. The speckle diffuser apparatus of claim 19, wherein the stationary cylinder extends laterally from the framed speckle diffuser element, and at least a portion of the torsion spring is wrapped around the stationary cylinder such that the stationary cylinder acts as an axis of rotation for the first end of the torsion spring and the second end of the torsion spring.

27. The speckle diffuser of apparatus of claim 26, wherein the stationary cylinder is a pin that is coupled to the framed speckle diffuser element.

28. The speckle diffuser apparatus of claim 26, wherein the stationary cylinder is formed from a frame that frames the framed speckle diffuser element.

29. The speckle diffuser apparatus of claim 19, further comprising:
one or more rails along which the speckle diffuser element is to move during oscillation of the speckle diffuser element, the one or more rails including at least one stationary rail.

\* \* \* \* \*